United States Patent Office 3,475,143
Patented Oct. 28, 1969

3,475,143
METAL TO METAL BONDS WITH CUPROUS HALIDE MELTS
Thomas L. O'Connor, Dedham, John B. Fredrickson, Sudbury, and Norman W. Rosenberg, Newton, Mass., assignors to Ionics, Incorporated, Cambridge, Mass.
No Drawing. Continuation-in-part of application Ser. No. 83,887, Jan. 23, 1961. This application Feb. 10, 1965, Ser. No. 431,692
Int. Cl. C23b 5/50, 5/18
U.S. Cl. 29—195
9 Claims

ABSTRACT OF THE DISCLOSURE

The invention is directed to a procedure for bonding metal to metal by employing a cuprous chloride as the bonding agent. The metals to be bonded are first coated with the cuprous chloride and then heated to a temperature sufficient to melt the coating. The metals are then brought together and cooled to result in the fused cuprous halide salt forming a strong bond between the metals.

---

This application is a continuation-in-part of applicants' copending application, Ser. No. 83,887, filed on Jan. 23, 1961, now abandoned.

This invention relates to the application of cuprous halides as thermoplastic adhesives for metal-to-metal bonds and, more particularly, to the preparation of said bonds by means of first coating the metal with a thin layer of a cuprous halide selected from the group consisting of chlorides, bromides and mixtures thereof through either electrolytic halidization of a copper plated laminae of the metal, or immersion of the metal in the cuprous halide melt, and then by the contacting of two or more of the prepared laminae at a temperature above the melting point of the halide, preferably under pressure.

It is proposed by this invention to offer a means whereby metals can be bound by an adhesive resistant to extremes of mechanical and thermal stresses occurring either singularly or simultaneously, such as are sustained by the stators and rotors of gyro assemblies, these systems being a specific application of this invention. The bonds obtained from the processes of this invention retain their adhesiveness up to a melting point of the particular halide used, which, being above 400° C., is considerably higher than the maximum temperatures at which an organic adhesive would be usable due to the relatively low melting points inherent in organic compounds. Inorganic adhesives known to the art, while in many cases possessing very high melting points, exhibit inadequate metal-to-metal adhesion. Furthermore, adhesives of this type tend toward brittleness even at temperatures below 200° C. and generally cannot sustain high mechanical stresses at elevated temperatures. The halides of copper (cuprous), except the fluoride, and the iodide are distinguished from other metal salts in that, upon melting and cooling, these halides will polymerize to form a tough plastic mass, which is ideally suited for bonding metals because of the excellent metal-to-metal adhesion and strength gained from the effect of its polymerization. Furthermore, the tendency toward brittleness is substantially negligible. Since cuprous fluoride disproportionates at or about its melting point it becomes clear that cuprous fluoride would not be operative in the present invention.

The products of the processes of this present invention are unique, not only in their application toward high temperature bonds for metals, but also in that they consist of a base metal with a uniform outer coating of a cuprous halide of the group consisting of chloride, bromide and mixtures thereof, which has especial use as an insulator and laminae adhesive for electrical conductors in high temperature systems. It is apparent that while silver halides may have some value as a bonding agent for metals, as described in U.S. Patents 2,583,581 and 2,705,830, the general run of metal halides do not have this property. It has now been found that cuprous halides such as chloride, bromide and mixtures thereof do possess this unique and unexpected property.

Appropriately, therefore, the primary object of the present invention is to provide a means whereby metal-to-metal bonds can be produced which can sustain high mechanical stresses at temperatures above 200° C.

A further object of the invention is to provide bonded laminates for use in gyro assemblies where shear strengths in excess of 1000 lbs./in.$^2$ and stability of adhesiveness at temperatures of about 400° C. are necessary.

A still further object of the invention is to provide a means whereby metals can be uniformly and economically coated with a metal salt for bonding thereof and which also acts as an insulator for electrical conductors in high temperature systems.

Still further objects and advantages will appear from the following description and examples.

In one of its preferred embodiments, the present invention comprises the electrolytic halidization of copper-plated laminae of the base metal followed by contacting a series of these laminae at a temperature above the melting point of the halide coating material and preferably under pressure. By this method, the thicknesses of the various layers in the coating can be regulated precisely and the interfaces are sharply defined. In plating the base metal, it is sometimes desirable that the base metal be first plated with a thin layer of a metal which is intermediate in the electromotive series to the base metal and copper metal, the copper to be later plated and halidized in order to reduce the tendency toward interaction of the base metal with the ions of the halidizing metal during the electrodeposition of that metal. In the case of plating a laminae of iron, steel, or aluminum, (or any other suitable base metal including base metal alloys which has a melting or fusing point higher than cuprous halides), with copper, the preliminary plating may consist of the electrodeposition of tin, lead, nickel, etc., to a thickness not ordinarily greater than 0.0001 inch. This preliminary plating is followed by electrodeposition of copper to a thickness preferably between 0.0003 inch and 0.005 inch.

The conventional electroplating procedures may be employed in plating the base metal and the necessary preparations of the base metal should also be observed, such as removal of any scale or tarnish by alkaline or organic solvent washes, polishing or buffing of the surfaces, and acid dipping. For efficient plating, the work bars supporting the metal to be plated must have an adequate current-carrying capacity and provide uniform distribution of the current. To provide cathode agitation, these work bars may be moved with a reciprocating motion of 15–40 cycles per minute and a displacement of 2–6 inches each way. Various electroplating solutions may be employed for the plating of any one metal; for example, copper may be electrodeposited from a bath utilizing copper cyanide, copper pyrophosphate, copper sulfate, or copper fluoborate.

Although electrodeposition is the most efficient means of obtaining a uniform coating of the plating metal upon the base metal, mechanical processes of plating metals may be used such as hot-rolling.

Following coating of the base metal with suitable thicknesses of intermediate and plating metals, the coated base metal is immersed in an electrolytic bath of the desired halide of potassium or sodium and made the anode. The cathode should be preferably be of the same composition as that of the plating metal; however, platinum is also suitable. Several types of halidizing solutions are appropriate for this process: one of which is conveniently prepared and especially efficient is a 1:1 methanol-water solution which contains the halide acid and the halide of potassium or sodium each IN concentration. The concentrations of the acid and the alkali metal halide preferably should be between 0.5 N and 2 N; however, solutions of divergent concentrations may be used with appropriate adjustments in current density and temperature. With a halidizing bath maintained at about room temperature, a current density between 5 and 40 amperes per square foot is commonly employed. The halidization is continued until between 10% and 90%, but preferably about 50% of the plating metal has been converted into the desired halide; the time required for a desired depth of halidization is determined from Faraday's Law.

The preferred final product of these successive electrolytic operations is therefore the original base metal coated in the following order. A metal which is intermediate in the electromotive series to the base metal and the plating metal (copper), the plating metal, and then a halide of the plating metal.

As an alternative to the process of electrodeposition of plating metals followed by their electrolytic halidization, the procedure of direct immersion of the base metal into a melt of the desired halide of copper (cuprous), may be employed. In this method, the final thickness of the halide coat may be governed by immersion of the base metal into a ceramic mold containing the molten halide and extracted from it when the temperature of the mold and coated base metals nears room temperature, whereupon the thickness of the halide coating will be the distance betwen the base metal and the inner wall of the mold minus the contradiction due to the cooling to room temperature of the molten halide. Preliminary to immersion in the mold, the base metal is preferably plated with both the intermediate metal and the plating metal, for adhesion of the halide of the plating metal to the plating metal is greater than that of the halide to the base metal.

Contacting a series of these coated metal laminae at a temperature at least slightly above that of the melting point of the halide coating, results in tough metal-to-metal bonds upon subsequent cooling. To insure optimum adhesion, the laminae are usually contacted under compression, a spring press serving adequately for this purpose. Adhesion of the laminae to the press itself is most conveniently prevented by placing non-halidized plated laminae at the ends of a series of laminae, or by placing ceramic plates between the laminae and the surfaces of the press.

Nowhere in the processes of this invention is any restriction imposed upon the nature of the base metal, its size or shape, other than that it have a higher melting point than that of the halide to be coated upon it. Similarly, no restriction is imposed upon the depths of the various coatings to be coated upon it nor on their number. Generally, the use of the cuprous halides of the present invention for bonding any base metals has proven successful. Nevertheless, even improved bonding effectiveness can be obtained in the case of bonding base metals of the transition metal group of the Periodic Chart which include Group 1B through 7B; and Ge, Al, Be, Mg, and Si by employing a metal which is intermediate in the electromotive series between the base metal and the metal (copper), then a plating of copper metal, and finally a halide of the copper plating metal. The same order is employed on the second base metal to be bonded to the first base metal. As examples of metals to be bonded with cuprous halides which give superior bonding without the use of intermediate coating metals may be mentioned Cu, nickel, Pt, Au, Ag, etc. Nevertheless, the present invention is directed to the use of cuprous halides selected from the group consisting of chloride, bromide and mixtures thereof as a bending agent for all metals having melting points above the melting point of the cuprous halide employed.

The metal-to-metal bonds secured from the processes of this invention consistently withstand shear and tensile stresses of greater than 1000 lbs./sq. in. at temperatures close to the melting point of the halide coating used as the adhesive. These bonds are, furthermore, stable under sudden changes in temperature, withstanding shocks of changes in the order of 400° C. over a period of less than one minute. In addition, the adhesive bonding of the present invention as applied to the metal laminae of stators and rotors of gyro assemblies also function as excellent insulators in minimizing the deleterious effects of Eddy currents.

As an illustration of the high degree of thermal stability which the halide adhesives produced by means of processes described in this invention possess, a table of melting points of the cuprous halides is presented below. It should be understood that a metal-to-metal bond formed from one of these halides retains its adhesiveness and shear strength to temperatures within a few degrees of the melting point of that particular halide.

$Cu_2Cl_2$ ------------------------------------ 422° C.
$Cu_2Br_2$ ------------------------------------ 504° C.

A further understanding of the present invention will be obtained from the following examples which are intended to be illustrative, and not as limiting the scope of the invention.

EXAMPLE 1

This example is directed to the bonding of the metal copper to copper and covers a procedure which does not involve an intermediate metal bonding procedure and is as follows:

Two laminae of copper strips 3" x 2" x 0.3" after cleaning with 1:1 methanol-water solution, which was IN in hydrochloric acid and IN in sodium chloride was made the anode. The cathode was a copper bar. The temperature was kept at about 25° C. and with a current density of 20 amp/sq. ft., 0.0004 inch of the copper was converted to cuprous chloride. The laminae were removed from the bath, rinsed, dried, contacted together in a spring press and heated in a muffle furnace to 460° C. The laminae were removed, cooled, and subjected to tests for bond strength. The bonds resisted sheer stresses of 180 lbs./0.1 in.$^2$ at 250° C. and tensile stresses of 200 lbs./0.1 in.$^2$ at 250° C. The laminae were then heated to 420° C., and then thrust into a dry ice-acetone mixture having a temperature of −48° C. and held there for 30 seconds. The bonds were retested for shear and tensile stresses and resisted forces equal to those applied before this subjection to a sudden temperature shock. The bonded laminae were subjected to face grinding. The face lamina was ground to a thickness of 0.01 inch with no sign of peeling of the plated layers. The bonded product obtained may be symbolically represented as:

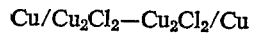

$Cu/Cu_2Cl_2—Cu_2Cl_2/Cu$

EXAMPLE 2

This example is directed to the bonding of iron to iron and is illustrative of the present invention where it is preferable to employ a metal which is intermediary in the electromotive series between iron and copper, viz. nickel, to effect the excellent bonding of said iron metals. Six rings of galvanized wrought iron 1.62 inches in outer diameter, 1.48 inches in inner diameter, and having a thickness of 0.12 inch were cleaned with perchloroethylene, methanol and distilled water and nickel-plated in a bath prepared with the following composition: Nickel sulfate, $NiSO_4·7H_2O$, 40 oz./gal.; Nickel chloride,

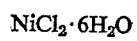

$NiCl_2·6H_2O$ 6 oz./gal.; Boric acid 4 oz./gal. The pH was adjusted to 4.0 and, at a temperature of 75± 2° C., a current density of 4.0 amp./sq.ft. was applied until a coating of nickel of a thickness of 0.00001 inch was deposited on the surfaces of the laminae. The rings were rinsed with water and immersed in a copper fluoborate plating bath having the following composition:

|  | Oz./gal. |
|---|---|
| Copper fluoborate, $Cu(BF_4)_2$ | 40 |
| Fluoboric acid, $HBF_4$ | 6 |
| Boric acid | 3 |

The pH was adjusted to 1.0 and, at a temperature of 40° C., a cathode current density of 48 amp./sq. ft. was applied until a coating of 0.001 inch of copper was attained on all the surfaces of the rings. Four of the rings were then placed in a 1:1 methanol-water solution, which was 1.2 N in hydrogen bromide and 1.8 N in sodium bromide and made the anode. The cathode was a platinum bar. The temperature was maintained at 25° C., and, with a current density of 30 amp/sq. ft., electrolysis was continued until 75% of the copper coating was converted into cuprous bromide. The rings were rinsed, dried, and placed together in cylindrical form in a spring press; two non-bromidized rings being situated at the top and bottom of the pile, and heated in a muffle furnace to a temperature of 520° C. Upon cooling, the cylinder was able to resist shear stresses of 180 lbs./0.1 in.² and tensile stresses of 200 lbs./0.1 in.² at 250° C. The cylinder withstood the same stresses after a sudden temperature drop of from 450° C. to 0° C.

The bonded product obtained may be symbolically represented as:

$$Fe/Ni/Cu/Cu_2Br_2-Cu_2Br_2/Cu/Ni/Fe$$

EXAMPLE 3

Two bars of 13% chromium stainless steel, type 410, 4" x 0.5" x 0.5" were nickel-and copper-plated according to the methods described in Example 2 to thicknesses respectively of 0.00001 inch and 0.0005 inch. They were then immersed in molten cuprous chloride contained in a ceramic mold composed of 68% clay, 20% flint, and 12% feldspar where the distance between the walls of the mold and the sides of the bars was 0.01 inch. Upon cooling and removal, the bars withstood the forces and temperatures described in Example 2.

The bonded product is characterized as:

$$Steel/Ni/Cu/Cu_2Cl_2-Cu_2Cl_2/Cu/Ni/Steel$$

EXAMPLE 4

This example is directed to the bonding of aluminum metal to aluminum metal wherein the "dip" method rather than electrocoating of an intermediate metal is employed.

A strip of aluminum was dipped in a bath containing ZnO (13.5 oz./gal.)·NaOH(65 oz./gal.), for a period of about 1.5 to 2.5 minutes. The bath was kept at a temperature of about 75 to 85° F. The zinc coated aluminum was removed from the bath, rinsed with water and transferred to a copper plating bath consisting of:

|  | Oz./gal. |
|---|---|
| Copper pyrophosphate | 1 |
| Potassium pyrophosphate | 35 |
| Citric acid | 2 |
| Potassium nitrate | 2 |

This bath was maintained at a temperature of about 125° to 150° F. at a pH between 6.8 to 8.5. The article employed as a cathode was plated with copper to a thickness of .002". The cathode current density was about 10 to 70 amps/sq. ft.; and, the current density of the copper anode was 20-100 amps/sq. ft. The rate of copper deposition was about .0005 to .0003 in./hr.

The anodizing and bonding of the two pieces of heated aluminum was effected in accordance with that of Example 2 above, except that the iodides were used in place of the bromides and the temperature of sealing (bonding) was 625° C. The resulting bonded metals can be represented symbolically as follows:

$$Al/Zn/Cu/Cu_2I_2-Cu_2I_2/Cu/Zn/Al$$

The result obtained was a very effective bond which conformed very favorably with the tests noted in the other examples, supra.

EXAMPLE 5

This example is directed to the bonding of copper to silver metals.

Two laminae were used, one of copper and the other of silver. The silver was first copper plated. Then, in accordance with the procedure described in Example 1, the two laminae were converted to cuprous chloride to thicknesses respectively of 0.0005 inch and 0.0001 inch. After anodizing and bonding said laminae, in accordance with said procedure, the laminae were cooled and removed and withstood the forces and temperatures in Example 1.

$$Cu/Cu_2Cl_2-Cu_2Cl_2/Cu/Ag$$

EXAMPLE 6

This example is directed to the bonding of aluminum to stainless steel.

Two laminae, one of aluminum and the other of stainless steel were zinc and nickel plated respectively, and subsequently copper plated and bonded in accordance with the procedures respectively described in Examples 4 and 3 above. The resulting bonded metals withstood the forces and temperature drops described in said Examples:

$$Al/Zn/Cu/Cu_2I_2-Cu_2Cl_2/Cu/Ni/Steel$$

Since certain changes may be made in the above process and apparatus without departing from the scope of the invention herein involved, it is intended that all matter contained in the above description shall be interpreted as illustrative and not in a limiting sense.

What we claim is:

1. A process for bonding metal-to-metal comprising adhering a layer of copper to the surface of said metals selected from the group consisting of nickel, platinum, beryllium, iron, steel, aluminum, silicon, germanium, scandium, yttrium, lanthranum, actinium, titanium, zirconium, hafnium, vanadium, columbium, tantalum, chromium, molybdenum, tungsten, manganese, technectium, and rhenium, depositing cuprous halide on the surface of said copper to form a copper-cuprous halide mixture consisting of from about 10% to 90% cuprous halide, said halide selected from the group consisting of chloride, bromide, and mixtures thereof and contacting the halide coated surfaces with each other at a temperature above the melting point of said cuprous halide.

2. The process of claim 1 wherein the cuprous halide deposition is effected by dipping said metals into a melt of said cuprous halide.

3. The process of claim 1 wherein the layer of copper is effected by electroplating said metals with copper and then electrolytically halidizing the plated copper.

4. A process for bonding metal-to-metal comprising: plating the surface of the base metals to be bonded with a metal which is located intermediate in the electromotive series to said base metal and copper, electroplating said plated surfaces with copper, electrolytically halidizing the copper, plating with a halide selected from the group consisting of chloride, bromide and mixtures thereof, and contacting said halidized surfaces with each other at a temperature above the melting point of the formed cuprous halide, said base metals having melting points higher than said cuprous halide.

5. The process of claim 4 wherein the base metals are steel and the intermediate metal is selected from the group consisting of nickel, tin and zinc.

6. Bonded metals comprising a layer of copper on the bonded surfaces of said metals and an adhesive between said copper of cuprous halide selected from the group consisting of chloride, bromide and mixtures thereof, said copper-cuprous halide mixture consisting of about 10% to 90% cuprous halide and said bonded metals selected from the group consisting of nickel, platinum, beryllium, iron, steel, aluminum, silicon, scandium, yttrium, lanthanum, actinium, titanium, zirconium, hafnium, vanadium, columbium, tantalum, chromium, molybdenum, tungsten, manganese, technetium, and rhenium.

7. Bonded base metals comprised of a layer of intermediate metal on the surfaces of said base metals to be bonded, said intermediate metal which is located intermediate in the electromotive series to said bonded base metal and that of copper, a layer of copper on said intermediate metal and an adhesive between said copper of cuprous halide selected from the group consisting of chloride, bromide and mixtures thereof, the said base metals selected from the group consisting of nickel, platinum, beryllium, iron, steel, aluminum, silicon, germanium, scandium, yttrium, lanthanum, actinium, titanium, zirconium, hafnium, vanadium, columbium, tantalum, chromium, molybdenum, tungsten, manganese, technetium, and rhenium.

8. A process for bonding copper-to-copper comprising coating the copper surface with a cuprous halide selected from the group consisting of chloride, bromide and mixtures thereof and contacting said halidized surfaces with each other at a temperature above the melting point of the cuprous halide.

9. Bonded copper metals comprising an adhesive between said copper metals of cuprous halide selected from the group consisting of chloride, bromide and mixtures thereof.

References Cited
UNITED STATES PATENTS

| | | | |
|---|---|---|---|
| 1,660,650 | 2/1928 | Mailey | 174—152 |
| 2,398,738 | 4/1946 | Gilbert | 117—130 |
| 2,483,075 | 9/1949 | Truesdale | 117—130 |
| 2,604,229 | 7/1952 | Schwarz | 220—82 |
| 2,670,395 | 2/1954 | Audubert et al. | 204—56 |
| 2,705,830 | 4/1955 | Lukens | 29—195 |

ROBERT F. BURNETT, Primary Examiner

R. J. ROCHE, Assistant Examiner

U.S. Cl. X.R.

23—87; 29—199, 470; 117—71, 72; 156—325; 161—213; 204—56